United States Patent [19]

Jennings

[11] Patent Number: 5,375,164
[45] Date of Patent: Dec. 20, 1994

[54] MULTIPLE LANGUAGE CAPABILITY IN AN INTERACTIVE SYSTEM

[75] Inventor: Terry D. Jennings, Westminster, Colo.

[73] Assignee: AT&T Corp., Murray Hill, N.J.

[21] Appl. No.: 928,381

[22] Filed: Aug. 12, 1992

Related U.S. Application Data

[63] Continuation-in-part of Ser. No. 889,007, May 26, 1992.

[51] Int. Cl.$^5$ .................. H04M 1/00; G06G 7/00
[52] U.S. Cl. ........................... 379/88; 379/67; 379/89; 364/419.01; 364/419.02; 381/51; 434/157; 434/185
[58] Field of Search ................. 379/88, 89, 67; 364/419.01, 419.02, 419.05, 419.08, 419.16; 434/157, 156, 185, 307, 308; 381/43, 51; 340/721

[56] References Cited

U.S. PATENT DOCUMENTS

| | | | |
|---|---|---|---|
| 4,566,078 | 1/1986 | Crabtree . | |
| 4,615,002 | 9/1986 | Innes . | |
| 4,654,798 | 3/1987 | Taki et al. | 364/419 |
| 4,700,322 | 10/1987 | Benbassat et al. | 364/51 |
| 4,882,681 | 11/1989 | Brotz | 364/419 |
| 5,120,945 | 6/1992 | Nishibe et al. | 235/379 |
| 5,148,541 | 9/1992 | Lee | 395/600 |

OTHER PUBLICATIONS

"Multiple Language Capability in an Interactive System", International Technology Disclosures, vol. 9, No. 5, May 25, 1991, Annomyous.

*Primary Examiner*—James L. Dwyer
*Assistant Examiner*—Fan Tsang
*Attorney, Agent, or Firm*—Joseph J. Opalach

[57] ABSTRACT

The data entry portion of a voice messaging system is constructed to be language, culture, or market segment independent. In particular, the design of the voice messaging system is based upon "semantic expressions," which are used to evaluate any language, culture, or market specific data that is entered by a user. In particular, each type of data entry is treated as a "semantic expression" having an identifier. This identifier is mapped into a plurality of rules, each rule providing instructions on how to interpret the input data for a particular language, culture, or market segment. The rules can recursively call other rules to provide additional flexibility in interpreting information that is entered by a user.

10 Claims, 4 Drawing Sheets

FIG. 1
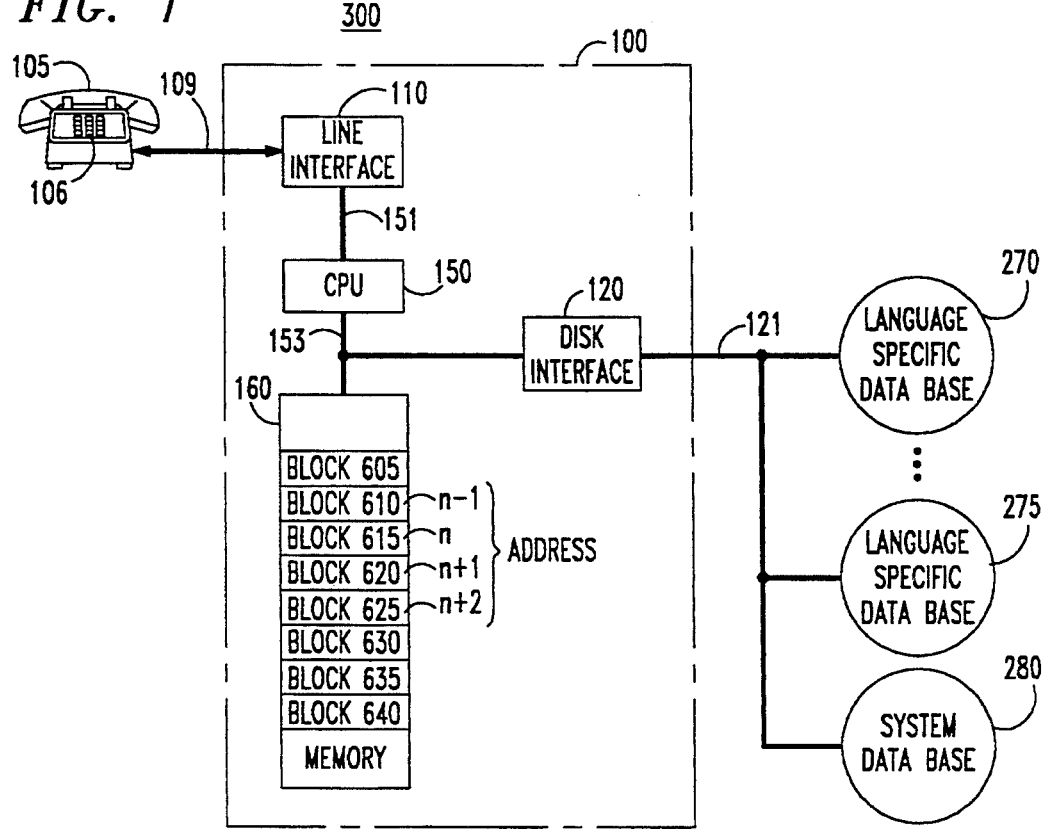
FIG. 2
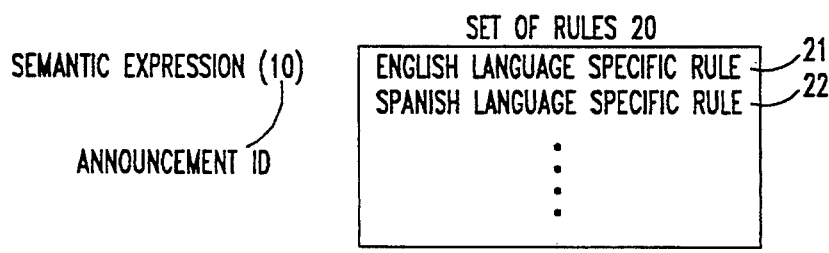
FIG. 3
LANGUAGE SPECIFIC RULE 25
"voice fragment 1," "voice fragment 2," VARIABLE 1, "voice fragment 3," (construction rule 1)
VALUE
ANNOUNCEMENT ID

RULE 21:

"You have" NUMBER "New voice mail" (if number == 1 "message" else "messages")

RULE 46:

(if NUMBER > 10 "Too big a number of" else "NUMBER")

ENGLISH RULE 76 AND AMERICAN RULE 78
(Return day)

ENGLISH RULE 86 AND AMERICAN RULE 88
(Return month)

MULTIPLE LANGUAGE CAPABILITY IN AN INTERACTIVE SYSTEM

CROSS-REFERENCE TO RELATED APPLICATION

This is a continuation in part of application Ser. No. 07/889007, filed May 26, 1992.

BACKGROUND OF THE INVENTION

This invention relates to voice messaging techniques used in telephone systems.

Voice messaging telephone systems have grown in popularity over the years and are widely available for use by the public. For example, a visitor at a hotel now has the ability to receive an actual voice message from a calling party through the hotel's telephone system rather than through a hand written message slip from a member of the hotel staff. Another example is in the area of incoming call management systems, where a customer's telephone call is answered by a voice messaging system and the customer is guided by a series of announcements, i.e., voice prompts, to either place an order, receive an account balance, etc.

As described above, in a voice messaging telephone system, an announcement is played back to a user and either provides the user with information or prompts the user for action. For example, the user, in following a sequence of announcement instructions, may enter information that is representative of a time and a date in order to set the time and date for the delivery of an earlier-recorded voice mail message. In providing these announcements to a user, the design and use of a voice messaging system is simplified if only one language is supported. For example, the sentence structure required for any announcement is known a priori thereby making the construction of each announcement simpler. However, even if only one language is supported, there is still a problem of entering information that is user-dependent into a voice messaging system. For example, even though the English language is spoken in both the United States and England, the structure of information representing a date is different. In the United States a date is represented in a "month/day" format, while in England a date may be represented in a "day/month" format. This problem is further compounded if additional languages, or market segments, are required to be supported by the voice messaging system. For example, a voice messaging system for use by the government may require the use of a twenty-four hour clock instead of twelve hour clock with A.M. and P.M. designations.

As a result of language, culture, or market, specific variations in representing information, the design of the data entry portion of any voice messaging system typically results in an implementation that is user specific. Continuing with the above date example, either a custom computer program is written to accept data entry for each culture that is supported, or the user of a voice messaging system must conform to another culture's habits like a person in England being required to enter date information in the date format that is used within the United States. Consequently, a voice messaging system for use within the United States cannot be directly sold in England without further culture-specific design modifications to the existing voice messaging system, modifications that take time and incur additional expenses, and which thereby limit the multinational capability of existing voice messaging systems in an increasingly international marketplace. Further, if no change is made to the voice messaging system, the inconvenience, and insensitivity, of requiring a user in another country to conform their habits to those of users in the United States may be unacceptable.

SUMMARY OF THE INVENTION

According to the principles of this invention, the data entry portion of a voice messaging system is constructed to be language, culture, or market independent. In particular, the design of the voice messaging system is based upon "semantic expressions," which are used to evaluate any language, culture, or market, specific data that is entered by a user.

In an embodiment of the invention, a voice messaging system comprises a plurality of specific rules, a system data base, and a processor. Each type of data entry in the system is associated with an identifier, such as a number, that is independent of the language, culture, or market segment, of the user. The processor translates this number to a subset of the plurality of rules, which are stored in the system data base, and uses that rule associated with the desired language, culture, or market segment, to determine how to interpret the data entered by the user.

As a result, this invention allows language, cultural, or market, dependent input parameters to be administered without requiring the voice messaging system to be uniquely tailored to each particular input format. For example, in the United States, a system administrator can simply enter the date as: month/day; while in England, a system administrator can enter the information as day/month—yet no programming changes are required in the voice messaging system to process the entry of the date information in either format.

A feature of this invention is that the voice messaging system can be easily upgraded to support data entry by users of other languages, cultures, or market segments, by merely updating the plurality of rules on the system data base.

BRIEF DESCRIPTION OF THE DRAWING

FIG. 1 is a block diagram of a voice messaging system embodying the principles of the invention;

FIG. 2 is an illustration of a semantic expression used for providing voice announcements in the voice messaging system of FIG. 1;

FIG. 3 is an illustration of a language specific rule used for providing a voice announcement in the voice messaging system of FIG. 1;

DETAILED DESCRIPTION

Figures 4, 5:
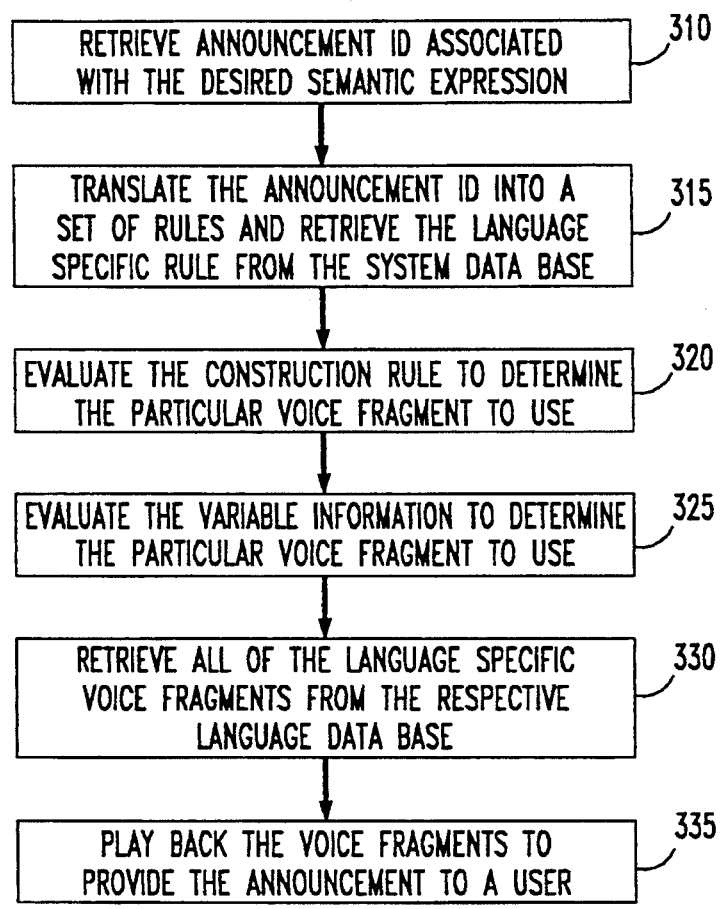
FIG. 4 is a flow diagram of a method for providing a voice announcement in the voice messaging system of FIG. 1.
FIG. 5 is an illustration of an English language rule used for providing a voice announcement in the voice messaging system of FIG. 1.

FIG. 1 shows a block diagram of a voice messaging system that embodies the inventive concept of this invention. The individual components of the voice messaging system are well-known and are not described in detail.

Voice messaging system 300 comprises processor 100, English language data base 270, Spanish language data base 275, and system data base 280. Processor 100 includes line interface 110, disk interface 120, CPU 150, memory 160, and paths 151 and 153. Paths 151 and 153 represent typical control and data paths used for the interchange of data between the various system components. Line interface 110 is the interface between CPU 150, via path 151, and telephone line 109, which is representative of one of a plurality of voice connections, each of which terminate at a telephone set, as represented by telephone set 105. Each voice connection is used to play back a voice announcement, in a particular language, to a user and to receive data entry from a user. Each user accesses voice messaging system 300 via telephone 105, which includes keypad 106. The latter is used not only to dial a telephone number but is also used to enter information into voice messaging system 300. Disk interface 120 is the interface between CPU 150, via path 153, and language data bases 270, 275 and system data base 280, via path 121. Each of the language data bases comprise a set of language specific voice fragments, where each voice fragment is a portion of speech in a particular language. System data base 280 stores system specific information. CPU 150 is a microprocessor central processing unit, which operates on, or executes, program data stored in memory 160, via path 153. CPU 150 applies and controls the playback of a particular language specific announcement to telephone line 109. Memory 160 comprises a number of storage locations, of which a subset is shown in FIG. 1. In each storage location, data representative of the program, i.e., program data, is stored. Further, the storage locations shown are only representative, e.g., the storage location for block 610 may actually comprise additional storage locations that are needed to store a program representative of block 610.

Before describing the invention, it will be useful to describe how voice messaging system 300 provides voice announcements to a user in different languages. In voice messaging system 300, each voice announcement is associated with a "semantic expression," having an announcement identifier, such as a number (announcement ID), e.g., a semantic expression having announcement ID 10 is shown in FIG. 2. In addition, each announcement ID, in turn, is associated with a set of rules. For example, an announcement ID may be a pan of a "data structure," which is a well-known programming technique, the data structure including a pointer to the associated set of rules. This pointer thereby translates the announcement ID into the associated set of rules. Each rule, in the associated set of rules, comprises language specific information. This is shown in FIG. 2, where announcement ID 10 is associated with set of rules 20 comprising two rules—English language rule 21 and Spanish language rule 22. Each language specific rule is used by CPU 150 to calculate a set of language specific voice fragments to associate with a semantic expression. The set of rules, for each announcement ID, is stored on system data base 280.

Each language specific rule comprises language specific information that includes any amount of: voice fragment information, variable information, and language specific construction information. This is shown in FIG. 3 for illustrative rule 25. Voice fragment information is included within quotes, e.g., "voice fragment 1." A voice fragment corresponds to the recorded portion of voice data to be taken from a respective language data base. In other words, "voice fragment 1" is a pointer to the recorded portion of voice data stored on a particular language data base.

Variable information is illustrated by the use of capital letters, e.g., VARIABLE 1. A VARIABLE includes two components. The first component of a VARIABLE is the value of the VARIABLE, this value may be used in the language specific construction of the rule. The second component of a VARIABLE is an announcement ID. This announcement ID is just another semantic expression that determines which language specific voice fragment to use depending on the value of the VARIABLE. In other words, each language specific rule can recursively call another semantic expression in order to provide a voice fragment for the value of the VARIABLE. This allows the substitution of the respective voice fragment for the value of the VARIABLE to be language dependent. In fact, this allows a voice messaging system to easily handle any additional language nuances.

The language specific construction information is included within parentheses, e.g., (construction rule), and reflects the fact that a language specific voice fragment is dependent upon the value of a VARIABLE in that rule. This provides additional flexibility for varying the content of an announcement. For example, a dependency may exist on whether the value of a VARIABLE is greater than one. If the value is greater than one, a voice fragment representing a "plural" language expression is used. While if the value is equal to one, a voice fragment representing a "singular" language expression is used.

The flow diagram shown in FIG. 4 is a representative method to provide voice announcements to a user in a particular language based upon the use of semantic expressions. As illustration, it is assumed that a user connected via telephone line 109 is waiting to receive information, i.e., a voice announcement from voice messaging system 300. The particular language to use for a particular voice announcement can be determined, a prior, in a number of ways, e.g., by the type of voice messaging service provided by voice messaging system 300, by the location of the telephone line on which an incoming telephone call appears, etc. In this example, it is assumed, for simplicity, that for a telephone call on telephone line 109 CPU 150 must provide an English language announcement that is representative of a semantic expression associated with informing a user how many new voice-mail messages they have. The corresponding announcement ID is 10, which is shown in FIG. 2. In order to construct this voice announcement, CPU 150 retrieves, i.e., reads from memory, the announcement ID identified with this semantic expression, i.e., ID=10 (block 310). CPU 150 then translates this number to identify the set of rules associated with this semantic expression. As a result, as shown in FIG. 2, CPU 150 translates the announcement ID 10 to identify set of rules 20. From this set of rules, each particular language specific rule is associated with a given "offset" into the set of rules, where the offset is a function of the particular language to use. In this example, as shown in FIG. 2, the English language rule is the first rule in the set of rules with a resulting offset that is defined as one, a Spanish language rule would have an offset equal to two. Therefore, CPU 150 retrieves the first rule, which is rule 21, from the set of rules 20 stored on system data base 280 (block 315). Rule 21 is then processed by CPU 150 to construct an English language announcement of the semantic expression identified by announcement ID 10. Rule 21 is illustrated in FIG. 5. As can be seen from FIG. 5, rule 21 comprises two voice fragments, one VARIABLE and one construction rule.

First, CPU 150 evaluates the construction rule based on the value of NUMBER. The construction rule is represented as a simple "if then else" statement. If the value of NUMBER is equivalent to one, then CPU 150 will use the language specific voice fragment associated with "message." If the value of NUMBER is not equivalent to one, then CPU 150 will use the language specific voice fragment associated with "messages" (block 320). For this example, it will be assumed the value of NUMBER is equal to five. As a result, the voice fragment associated with "messages" is used.

Second, CPU 150 determines the voice fragment to use for the value of NUMBER. As mentioned above, NUMBER also has associated with it an announcement ID, which in turn has an associated set of rules. A representative English language rule for NUMBER is shown in FIG. 5 as rule 46. This rule comprises only a construction rule. If the value of NUMBER is greater than 10, CPU 150 will use the language specific voice fragment associated with "too big a number of." If the value of NUMBER is ten or less, then CPU 150 will use the language specific voice fragment associated with the value of NUMBER, e.g., "five" (block 325). It should be noted that although a separate evaluation step is shown in FIG. 4 to provide the voice fragment associated with the value of NUMBER, the method of FIG. 4 can be modified to be recursively executed by CPU 150 to provide this voice fragment since a VARIABLE has an associated announcement ID. In other words, the evaluation of VARIABLE can be treated as just another announcement.

After determining the voice fragments to use for any construction rules or VARIABLES contained within a language specific rule, CPU 150 then retrieves from the language specific data base all of the voice fragments, and combines them in the order indicated by the rule to create the language specific announcement. In the context of this example, CPU 150 will retrieve the following voice fragments from English language data base 270: "You have" "five" "new voice mail" "messages" (block 330). Each of these voice fragments is identified by the respective pointer that was associated with each voice fragment generated by rule 21. This English language announcement is then played back, or broadcast, via telephone line 109, to the user (block 335).

The above description allows voice announcements to be provided to a user in any of a number of different languages by associating with each type of voice announcement a semantic expression, which is associated with an announcement ID. In particular, the above method generally comprises the following steps: 1) select the rule to use as a function of the type of voice announcement and the specific language to use, 2) calculate, or determine, the list of voice fragments to use from the selected rule, and 3) collect the actual voice fragments specified by the rule for play-back to the user. It can be observed from the first two steps that a sequence of numbers is being generated, the sequence being dependent upon the rule selected to play-back a particular voice announcement in a particular language. Each number in this sequence of numbers is merely a pointer to a respective voice fragment. This sequence of numbers is then used in step 3 to retrieve the particular voice fragments. However, and in accordance with the invention, the generation of a sequence of numbers at step 2 can be used to evaluate any language, culture, or market, specific data that is entered by a user. In particular, each type of data entry in voice messaging system 300 is associated with a semantic expression. In other words, for each type of data entry a "special announcement" or "data announcement" is created within voice messaging system 300. This is a special announcement because it only uses the data generated by step 2. The above-mentioned step 3 is never performed so that no voice message, or voice announcement, is actually provided to a user.

As an illustration, a user of voice messaging system 300 accesses processor 100 via telephone line 109 to set the month and day for the delivery of a voice-mail message that, it is assumed, was recorded earlier by the user. In particular, a user at telephone set 105 enters information into voice messaging system 300 via keypad 106. In response to the user's keystrokes, telephone set 105 sends "touch-tones" to voice messaging system 300 via telephone line 109. The information sent by a user at telephone set 105, via the touch-tones, is a string of data that comprises five digits: $N_1N_2N_3N_4N_5$, each digit represented by a particular touch-tone. In this example, it is assumed that the last digit, $N_5$ is a "#," which indicates the end of the data input string. This string of data is received for interpretation by CPU 150 from line interface 110. It is assumed that line interface 110 filters out the touch-tone representing the "#."

Figure 6:
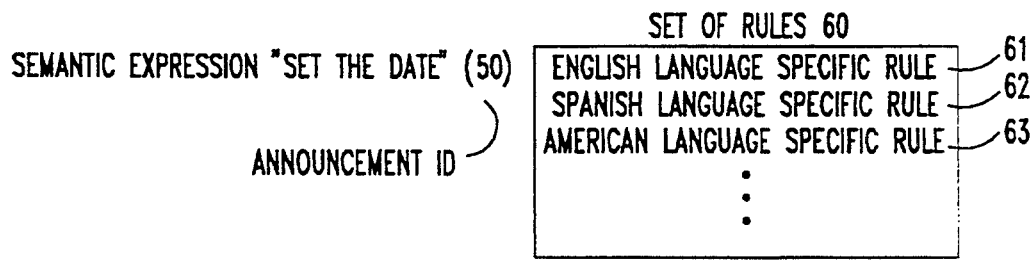
FIG. 6 is an illustration of a semantic expression embodying the principles of the invention.

As shown in FIG. 6, this type of data entry is associated with a semantic expression to "set the date," which is associated with data announcement ID 50. The latter, as described above, has associated with it set of rules 60, which include English rule 61 and American rule 63. Each rule is associated with interpreting the input data string into a particular format. In this example, English rule 61 and America rule 63 comprise VARIABILE information and are shown in FIG. 7.

English role 61 parses the string of data into two pairs of digits, each pair treated as VARIABLE information as described above. The first pair, $N_1N_2$, has two components: the value of $N_1N_2$, and associated announcement ID 70. In other words, rule 61 recursively calls another announcement rule in order to evaluate the data string. Similarly, the next pair of digits each have a value and an associated announcement string.

Figure 7:
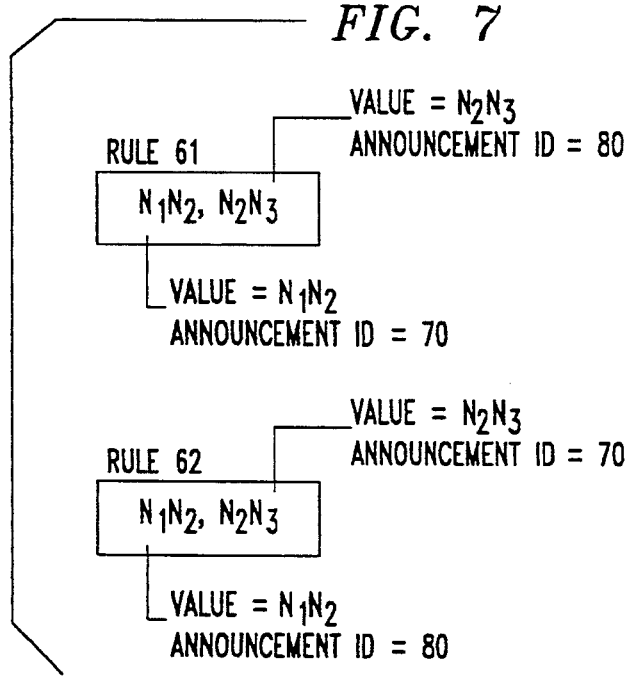
FIGS. 7-9 are illustrations of rules used for interpreting information entered by a user in the voice messaging system of FIG. 1.

Similar to English rule 61, American rule 63 is also shown in FIG. 7. However, note that the associated announcement IDs for each pair of digits is different. Consequently, American rule 63 will interpret the information represented by each pair of digits differently than English rule 61.

Figure 8:
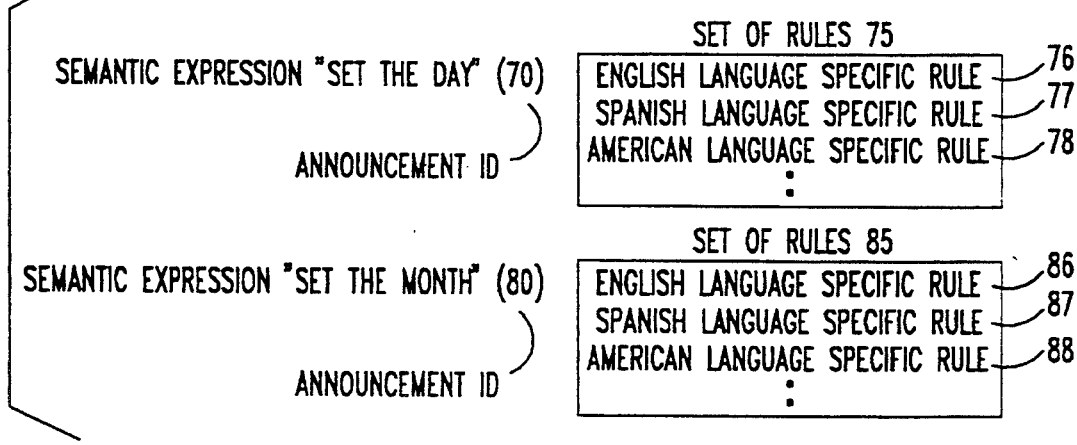

The associated announcement IDs for both English rule 61 and American rule 63 are shown in FIG. 8. In particular, announcement ID 70 is associated with interpreting an input string to determine the day, and announcement ID 80 is associated with interpreting an input string to determine the month. Thus, English rule 61 parses, or evaluates, the input string as though the data was provided in a "day/month" format, while American rule 63 evaluates the input string as though the data was provided in a "month/day" format.

Figures 9, 10:
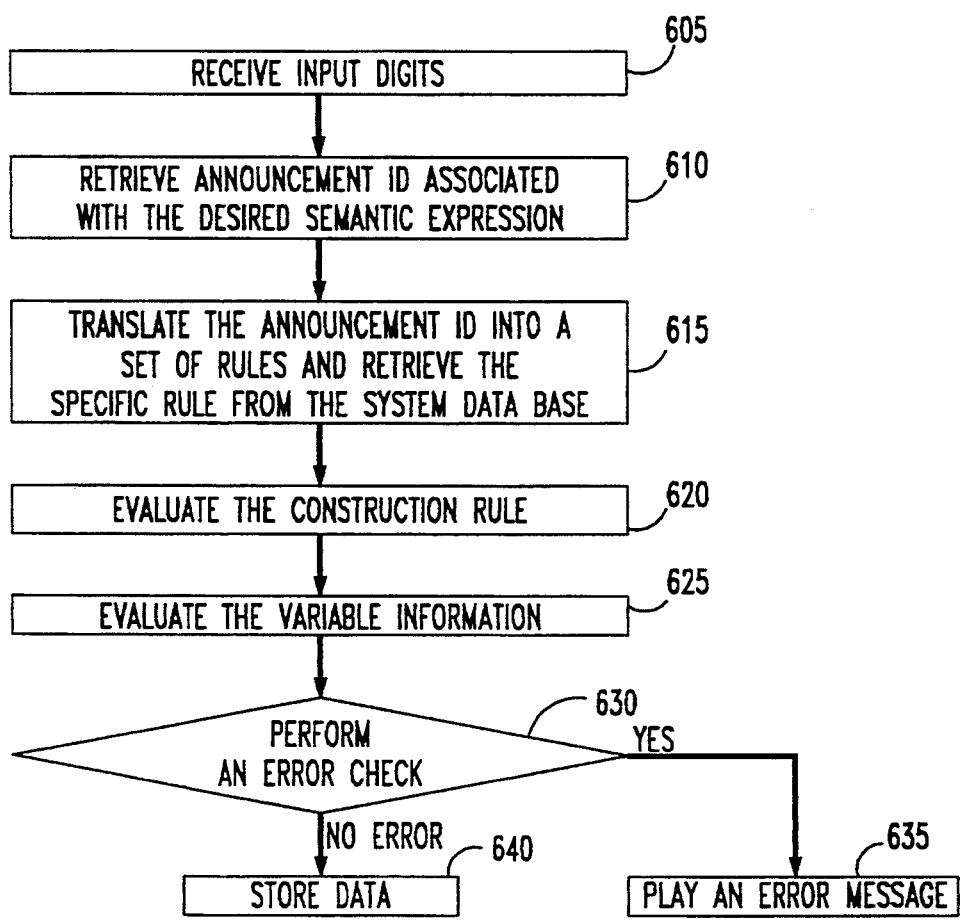
FIG. 10 is a flow diagram of a method embodying the principles of the invention.

As shown in FIG. 8, each set of rules 70 and 80 includes language, cultural, or market, specific rules. For example, set of rules 75, which is associated with setting the day, further comprises English rule 76 and American rule 78. Since this particular example illustrates the interpretation of data entry in a situation where one user is in England and another in the United States, i.e., they speak the same language, it is assumed that each specific rule is identical. FIG. 9 shows the two constructions rules that are associated with interpreting the data entry. Each rule shown in FIG. 9 sets the corresponding system variable to the appropriate value. In other words, CPU 150 correctly parses the data input into the appropriate format, via English rule 61 or American rule 63, and the remaining construction rule merely assigns the pairs of digits to the appropriate system variable that represents the day and the month. Similar to the description above for a voice announcement, the evaluation of a particular rule returns a sequence of numbers. However, instead of using the sequence of numbers to retrieve a set of voice fragments, each number is used to represent the value for a system variable. This system variable is then checked by CPU 150 for any errors. For example, CPU 150 will check the value of the day variable from rules 76 and 78 to ensure that the proper number of days has been entered given the value of the month variable from rules 86 and 88, e.g., if it is November, are the number of days in the range of 1 to 30.

The flow diagram shown in FIG. 10 is a representative method embodying the principles of the invention. As described above, it is assumed that a user connected via telephone line 109, enters a string of five digits in order to enter information representative of the date into voice messaging system 300. The particular language, culture, or market specific rule to use can be determined, a prior, in a number of ways, e.g., by the type of voice messaging service provided by voice messaging system 300, by the location of the telephone line on which an incoming telephone call appears, by the system administration parameters that identify a particular user with a particular language, culture, or market, etc. In this example, it is assumed, for simplicity, that for a telephone call on telephone line 109 CPU 150 must use an English rule to interpret input data. The input string of digits is received by CPU 150 from line interface 110 (block 605). In order to interpret this data, CPU 150 retrieves, i.e., reads from memory, the data announcement ID identified with this type of input data, i.e., ID=50 (block 610). CPU 150 then translates this number to identify the set of rules associated with this semantic expression. As a result, as shown in FIG. 6, CPU 150 translates the announcement ID 10 to identify set of rules 60. From this set of rules, each particular specific rule is associated with a given "offset" into the set of rules. In this example, as shown in FIG. 2, the English rule is the first rule in the set of rules with a resulting offset that is defined as one, while an American rule is associated with an offset equal to three. Therefore, CPU 150 retrieves the first rule, which is rule 61, from the set of rules 60 stored on system data base 280 (block 615). Rule 61 is then processed by CPU 150 to interpret the input data string as a date, which uses an English format. Rule 61 is illustrated in FIG. 7. As can be seen from FIG. 7, rule 61 comprises VARIABLE information.

First, CPU 150 evaluates any construction rule that is present in the culture-specific rule (block 620). Here, since there is no construction rule, CPU 150 proceeds directly to the next step.

Second, CPU 150 evaluates any VARIABLE information that is present in the specific rule (block 625). As mentioned above, each VARIABLE also has associated with it a data announcement ID, which in turn has an associated set of rules. A representative English rule for $N_1N_2$ is shown in FIG. 9 as rule 76. This rule comprises only a construction rule that assigns the value of $N_1N_2$ to the variable day. Similarly, English rule 86 assigns the values of $N_3N_4$ to the variable month.

Third, CPU 150 then performs an error check on the value of each of the variables, day and month, to ensure that the appropriate data is stored within the variable (block 630). If an error is detected, an error message, in this case an announcement, is played back to the user at telephone set 105 requesting them to reenter the data (block 635). If no error is detected, CPU 150 then stores the variable information in memory 160 (block 640).

In accordance with a feature of the invention, the use of a semantic expression to represent a type of data entry allows the design of voice messaging system 300 to be language, culture, or market segment independent. If a new language, culture, or market segment, needs to be supported, a representative specific rule merely needs to be added to the sets of rules stored on system data base 280.

In the context of the flow diagram of the method shown in FIG. 10, the steps performed by CPU 150 are stored in memory 160, beginning at location n−1, and operated on, or executed, by CPU 150. For example, as described above, CPU 150 executes a program comprising program data representative of block 610 at memory location n−1 and then executes program data representative of block 615 at memory location n, etc. As a result, FIG. 1 shows how the illustrative method of FIG. 10 is implemented in voice messaging processor 100.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the above example illustrated the use of touchtones, any form of data entry can similarly be used, like text input from a data terminal. Also, the above example illustrates the use of a VARIABLE rule that recursively calls a construction rule, however, instead of the use of a VARIABLE rule, a single construction rule, which interprets the entire string of input data, can be used. Finally, the construction rules themselves can incorporate the error-checking.

I claim:
1. A voice messaging system comprising:
receiving means for providing a string of input data;
means for storing a set of announcements, each announcement represented by an identifier, each identifier associated with a plurality of rules, each rule associated with a format; and
means for interpreting the string of input data to provide an output data string in a predetermined format by evaluating said string of input data in accordance with one of the plurality of rules associated with said predetermined format; wherein at least one of the plurality of rules comprises a representation of variable information and a construction rule, wherein the variable information includes an identifier associated with another announcement.

2. A voice messaging system for providing announcements in a plurality of languages, the system comprising:
   means for storing a set of announcements, the announcement set comprising a first subset of announcements and a second subset of announcements, where each announcement in the first subset is represented by an identifier, each identifier associated with a plurality of rules, each rule associated with a particular language for constructing said announcement, and where each announcement in the second subset is represented by an identifier, each identifier associated with a plurality of rules, each rule associated with a particular format for evaluating an input data string;
   means for storing a plurality of language specific data bases, each language specific data base comprising a plurality of language specific output information;
   means for providing an announcement, from the first subset of announcements, to a user in a selected one of said plurality of languages by selecting ones of the plurality of language specific output information from the respective language specific data base in accordance with the one of the plurality of rules associated with said selected language and said announcement; and
   means for interpreting an input data string from the user to provide an output data string in a particular format, the input data string associated with an announcement from the second subset of announcements and the output data string constructed in accordance with one of the plurality of rules associated with said particular format and said announcement taken from the second subset of announcements.

3. The apparatus of claim 2 wherein the language specific output information is a language specific voice fragment and the means for providing an announcement plays the plurality of language specific voice fragments to provide the announcement in the selected one of said languages to the user.

4. The system of claim 3 wherein said voice fragments are obtained from the data base of the selected language.

5. The apparatus of claim 2 wherein at least one of the rules comprises a representation of a variable and a construction rule.

6. A voice messaging system for providing announcements in a plurality of languages, the system comprising:
   means for storing the plurality of languages, each language comprising a plurality of voice fragments;
   second means for storing a first set of voice announcements and a second set of data announcements, where each voice announcement in the first set is represented by an identifier, each identifier associated with a plurality of rules, each rule associated with one of the plurality of languages, and where each data announcement in the second set is represented by an identifier, each identifier associated with a plurality of rules, each rule associated with one of a plurality of formats;
   means first providing one of the voice announcements to a user in a particular language by playing ones of the plurality of language specific voice fragments that are selected in accordance with the one of the plurality of rules associated with the voice announcement in the particular language; and
   means for interpreting an input data string from the user to provide an output data string in a particular format by associating with the input data string a data announcement and then evaluating the input data string in accordance with the one of the plurality of rules associated with the data announcement and the particular format.

7. The apparatus of claim 6 wherein at least one of the rules comprises a representation of a variable and a construction rule.

8. Voice messaging apparatus comprising:
   receiving means to provide an input data string;
   means for storing a) a plurality of voice fragments in a first language and a plurality of first language rules, each first language rule associated with one of a plurality of voice announcements and including a reference to ones of the plurality of voice fragments, and b) a plurality of data announcements, each data announcement associated with a plurality of format rules, each format rule including information for parsing an input data string; and
   processing means for a) providing a first language specific output to a user and b) for storing an output data string in a particular format;
   where the first language specific output is representative of the plurality of voice fragments that are chosen in accordance with one of the plurality of first language rules associated with one of the plurality of announcements, and where the input data string is associated with one of the plurality of data announcements and the output data string is constructed in accordance with the one of the plurality of format rules corresponding to said particular format taken from the associated data announcement.

9. A method for providing an output data string in a selected one of a plurality of formats, the method comprising the steps of:
   receiving an input data string;
   retrieving an announcement identifier associated with an announcement from a data base:
   translating the announcement identifier to retrieve a set of rules for the announcement from the data base, the set of rules comprising a plurality of rules, each one of the plurality of rules associated with a respective one of the plurality of formats;
   selecting one of the plurality of rules associated with the selected one of the plurality of formats;
   constructing the output data string in the selected one of the plurality of formats by formatting said input data string in accordance with the selected one of the plurality of rules: and
   storing the output data string in a memory location;
   wherein the selected one of the plurality of rules includes information representative of variable information and construction information and the variable information includes a second announcement identifier associated with a second announcement.

10. A method for use in a voice messaging system comprising the steps of:
   storing a set of voice announcements, each voice announcement represented by an identifier, each identifier associated with a plurality of rules, each rule associated with a language and including a representation of some of a plurality of voice fragments in the language, the plurality of rules representing a plurality of languages;

storing a set of data announcements, each data announcement represented by an identifier, each identifier associated with a plurality of rules, each rule associated with a format;

storing a plurality of language specific data bases, each language specific data base comprising the plurality of language specific voice fragments;

selecting one of the set of voice announcements to provide as output to a user;

selecting one of the plurality of languages;

selecting one of the plurality of rules from the selected one of the set of voice announcements as a function of the selected one of the plurality of languages;

constructing a language specific voice announcement by providing the plurality of language specific voice fragments that are selected in accordance with the selected one of the plurality of rules taken from said voice announcement;

providing the language specific voice announcement to a user;

receiving from the user an input data string;

selecting one of the set of data announcements to interpret the input data string;

selecting one of the plurality of formats;

selecting one of the plurality of rules from the selected one of the set of data announcements as a function of the selected one of the plurality of formats; and storing an output data string that is constructed in accordance the selected one of the plurality of rules taken from said selected data announcement.

* * * * *